US009619785B2

(12) United States Patent
Ferguson

(10) Patent No.: US 9,619,785 B2
(45) Date of Patent: Apr. 11, 2017

(54) METHOD AND APPARATUS PERTAINING TO THE SENDING OF MESSAGES LACKING IDENTIFIED RECIPIENTS

(71) Applicant: Blackberry Limited, Waterloo (CA)

(72) Inventor: Geordon Thomas Ferguson, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/660,109

(22) Filed: Oct. 25, 2012

(65) Prior Publication Data

US 2014/0122617 A1 May 1, 2014
US 2014/0237054 A9 Aug. 21, 2014

(51) Int. Cl.
*G06F 15/16* (2006.01)
*G06Q 10/10* (2012.01)

(52) U.S. Cl.
CPC .................. *G06Q 10/107* (2013.01)

(58) Field of Classification Search
USPC .................................. 709/206, 238
See application file for complete search history.

(56) References Cited

U.S. PATENT DOCUMENTS

| 5,543,591 | A | * | 8/1996 | Gillespie et al. | 178/18.03 |
| 7,343,419 | B1 | * | 3/2008 | Robinson | 709/231 |
| 8,020,177 | B2 | * | 9/2011 | Marsala et al. | 719/330 |
| 8,589,911 | B1 | * | 11/2013 | Sharkey et al. | 717/173 |
| 2009/0271486 | A1 | * | 10/2009 | Ligh et al. | 709/206 |
| 2010/0082737 | A1 | * | 4/2010 | Dankle et al. | 709/203 |
| 2011/0145336 | A1 | * | 6/2011 | Carroll | 709/206 |
| 2011/0196935 | A1 | | 8/2011 | Rideout et al. | |
| 2011/0320548 | A1 | | 12/2011 | Jonsson | |
| 2012/0072856 | A1 | * | 3/2012 | Park | H04L 12/5815 715/752 |
| 2013/0019173 | A1 | * | 1/2013 | Kotler et al. | 715/711 |
| 2013/0218984 | A1 | * | 8/2013 | Langlois et al. | 709/206 |
| 2014/0026067 | A1 | * | 1/2014 | Park et al. | 715/748 |

FOREIGN PATENT DOCUMENTS

WO 2010/130046 A1 11/2010

OTHER PUBLICATIONS

Körbler, Günther; Examiner; Extended European Search Report from related European Patent Application No. 12190059.1 dated May 6, 2013; 6 pages.

* cited by examiner

*Primary Examiner* — Bryan Lee
*Assistant Examiner* — Oluwatosin Gidado
(74) *Attorney, Agent, or Firm* — Jon Gibbons; Fleit Gibbons Gutman Bongini & Bianco P.L.

(57) ABSTRACT

A control circuit detects an opportunity to send a message notwithstanding that no recipient is yet identified and identifies, without user input, a specific recipient from amongst a plurality of possible recipients of the message based, for example, on metadata regarding at least some of the possible recipients using one or more predetermined selection criteria. The control circuit can also determine a domain context for a message as corresponds to such an opportunity and use that domain context along with information corresponding to the message to query an invocation framework that cannot itself natively intuit domain context from the information. Received possible recipients can then be presented via a display to facilitate a user-based selection of one of the recipients.

20 Claims, 7 Drawing Sheets

METHOD AND APPARATUS PERTAINING TO THE SENDING OF MESSAGES LACKING IDENTIFIED RECIPIENTS

FIELD OF TECHNOLOGY

The present disclosure relates to the sending of messages in an electronic device and more particularly to the sending of messages between processing entities.

BACKGROUND

Many modern electronic devices, such so-called smartphones, tablet/pad-styled computers, and so forth, support a plurality of processing entities. This can include both hardware-centric processing entities (such as, for example, card or component-based processing entities) as well as software applications that run on hardware shared, at least from time to time, with other software applications. In many cases the electronic device can provide multitasking support that permits a plurality of such processing entities to operate effectively simultaneously with one another.

The ease and utility of the user experience often benefits from useful interaction amongst two or more of these processing entities. In many cases such interaction benefits (or even requires) that at least one such processing entity send a message to another such processing entity. Unfortunately, under some operating circumstances the sourcing/sending entity may not be able to identify a specific recipient notwithstanding a present need to send such a message.

DETAILED DESCRIPTION

Figure 1:
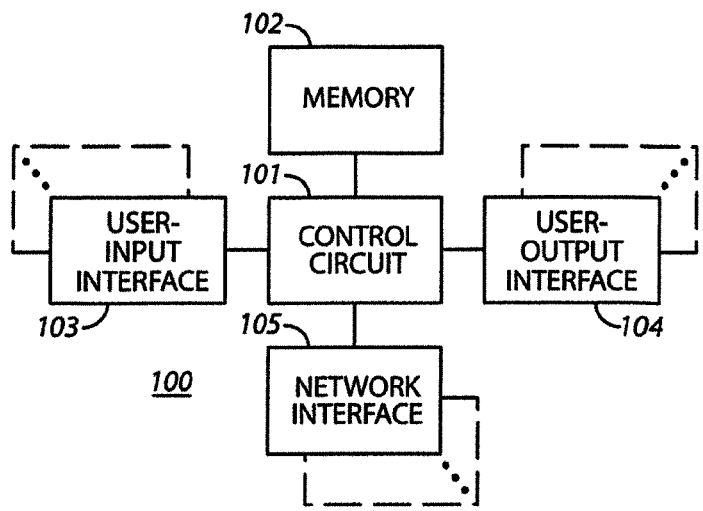
FIG. 1 is a block diagram in accordance with the disclosure.

The following describes an apparatus and method pertaining to leveraging opportunities to send messages even when no recipients are yet identified. By one approach a control circuit detects such an opportunity and identifies, without user input, a specific recipient from amongst a plurality of possible recipients of the message. This identification can be based, for example, on metadata regarding at least some of the possible recipients. If desired, at least some of this metadata can be self-sourced by the possible recipients. The control circuit can use one or more predetermined selection criteria to select only one of the candidate recipients as the specific recipient.

By another approach, employed in lieu of the foregoing or in combination therewith, upon detecting the aforementioned opportunity the control circuit determines a domain context for the message and uses that domain context along with information corresponding to the message to query an invocation framework that cannot itself natively intuit domain context from the information. Received possible recipients are then presented via a display. A user can then make an appropriate selection from amongst the presented possible recipients.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The various actions described herein will typically be carried out by an appropriate enabling apparatus of choice. More particularly, such an apparatus will typically include a control circuit that carries out such actions in cooperation with other components as appropriate. FIG. 1 presents an illustrative example of such an apparatus 100 and control circuit 101.

In this example the control circuit 101 operably couples to a memory 102 as well as a user-input interface 103, a user-output interface 104, and a network interface 105. Such a control circuit 101 can comprise a fixed-purpose hard-wired platform or can comprise a partially or wholly programmable platform. These architectural options are well known and understood in the art and require no further description here. This control circuit 101 is configured (for example, by using corresponding programming as will be well understood by those skilled in the art) to carry out one or more of the steps, actions, and/or functions described herein.

The memory 102 may be integral to the control circuit 101 or can be physically discrete (in whole or in part) from the control circuit 101 as desired. This memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

The user-input interface 103 can comprise any of a variety of user-input mechanisms (such as, but not limited to, keyboards and keypads, cursor-control devices, touch-sensitive displays, speech-recognition interfaces, gesture-recognition interfaces, and so forth) as are known in the art to facilitate receiving information and/or instructions from a user. The user-output interface 104, in turn, can comprise any of a variety of user-output mechanisms (such as, but not limited to, visual displays, audio transducers, printers, and so forth) to facilitate providing information to a user.

The network interface 105 can comprise one or more of a variety of network interfacing mechanisms including both wireless and non-wireless interfaces. These teachings will accommodate using any of a variety of such interfaces including, for example, short-range transceivers (such as BLUETOOTH™-compatible transceivers), mid-range transceivers (such as Wi-Fi™-compatible transceivers), and long-range transceivers (such as any of a variety of cellular telephony-based transceivers).

Figure 2:
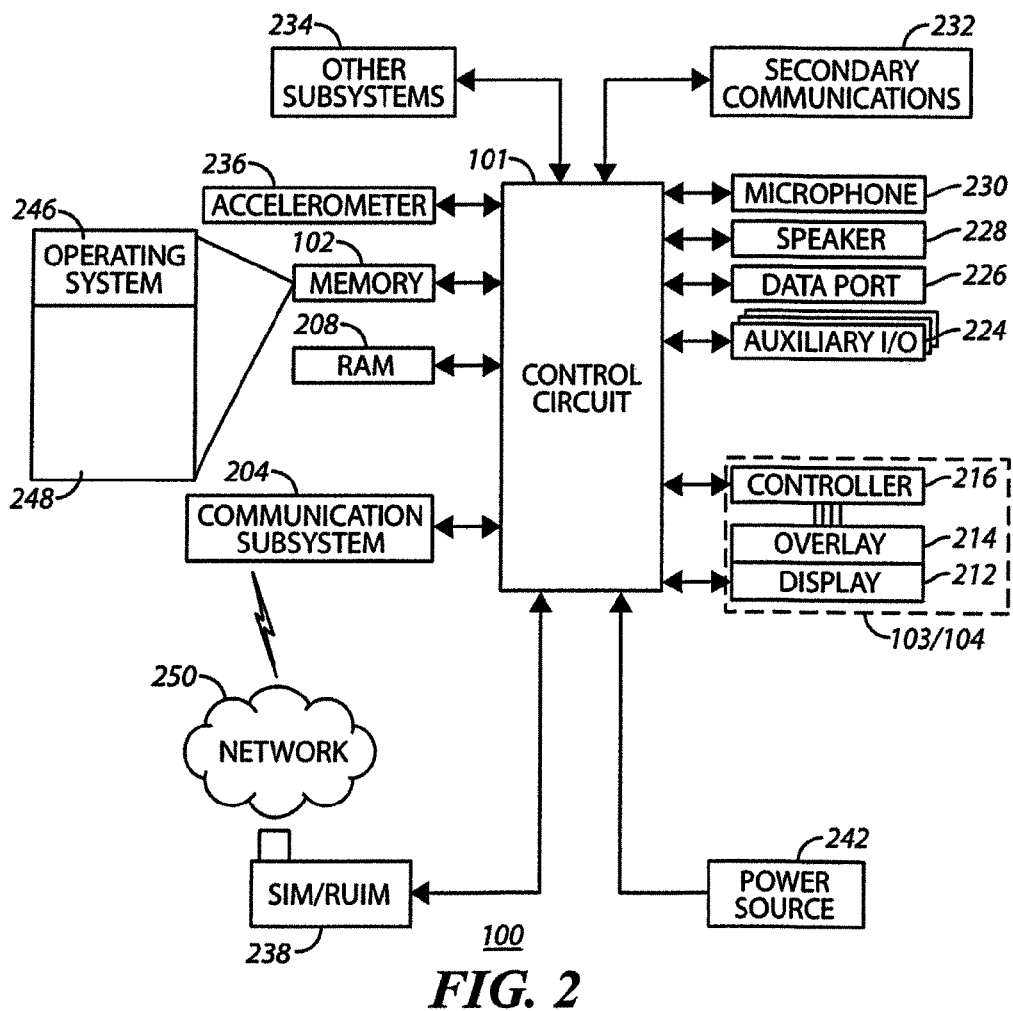
FIG. 2 is a block diagram in accordance with the disclosure.

For the sake of a more complete example in these regards, and to illustrate more fully one example of an enabling apparatus (but without intending any limitations by way of the specificity of these examples, FIG. 2 presents an example where the apparatus 100 comprises in particular a portable wireless communications device.

In this example a variety of communication functions, including data and voice communications, are performed through a communication subsystem 204 that operably couples to the aforementioned control circuit 101. The communication subsystem receives messages from and sends messages to a wireless network 250.

The wireless network 250 may be any type of wireless network, including, but not limited to, a wireless data networks, a wireless voice network, or a network that supports both voice and data communications. The control circuit 101 may also operably couple to a secondary communication subsystem 232 (such as an 802.11 or 802.16-compatible transceiver and/or a BLUETOOTH™-compatible transceiver). To identify a subscriber for network access, the portable electronic device may utilize a Subscriber Identity Module or a Removable User Identity Module (SIM/RUIM) card 238 for communication with a network, such as the wireless network 250. Alternatively, user identification information may be programmed into the aforementioned memory 102.

A power source 242, such as one or more rechargeable batteries or a port to an external power supply, powers the electronic device. The control circuit 101 may interact with an accelerometer 236 that may be utilized to detect direction of gravitational forces or gravity-induced reaction forces. The control circuit 101 also interacts with a variety of other components, such as a Random Access Memory (RAM) 208, an auxiliary input/output (I/O) subsystem 224, a data port 226, a speaker 228, a microphone 230, and other device subsystems 234 of choice.

The above-described user-input interface 103 and user-output interface 104 can comprise, by one approach, a display 212 that is disposed in conjunction with a touch-sensitive overlay 214 that operably couples to an electronic controller 216. Together these components can comprise a touch-sensitive display that serves as a graphical-user interface. Information, such as text, characters, symbols, images, icons, and other items may be displayed on the touch-sensitive display via the control circuit 101. Such an interface can also perceive a variety of user gestures such as a swiping fingertip. Generally speaking, a swipe is a touch that begins at one location on the touch-sensitive display and ends at another location (as when the user places their fingertip on the touch-sensitive display and then drags their fingertip along the surface of the touch-sensitive display before finally lifting their fingertip from that surface).

The apparatus 100 in this example includes an operating system 246 and software programs, applications, or components 248 that are executed by the control circuit 101 and that are typically stored in a persistent, updatable store such as the memory 102. Additional applications or programs may be loaded onto the portable electronic device through the wireless network 250, the auxiliary I/O subsystem 224, the data port 226, the secondary communications subsystem 232, or any other suitable subsystem 234.

As a communication device, a received signal such as a text message, an e-mail message, or web page download is processed by the communication subsystem and input to the control circuit 101. The control circuit 101 processes the received signal for output to the display 212 and/or to the auxiliary I/O subsystem 224. A user may generate data items, for example e-mail messages, that may be transmitted over the wireless network 250 through the communication subsystem. For voice communications, the overall operation of the portable electronic device is similar. The speaker 228 outputs audible information converted from electrical signals, and the microphone 230 converts audible information into electrical signals for processing.

For the sake of an illustrative example, the following description will presume the use of such an apparatus 100. It will again be understood, however, that no particular limitations are intended in these regards. It will also be presumed that the control circuit 101 is configured to effect an invocation framework by which a given client can send an invoke message to a target. Invocation more specifically addresses locating a target instance (spawning one if necessary) and delivering the invocation message. Although the present teachings are not necessarily limited to only an invocation framework, it may be helpful to the reader to present an in-depth review of the invocation framework contemplated herein.

As mentioned above, invocation is the process by which a client can send an invocation message to a target and includes in a given instance locating a target instance and delivering the corresponding invocation message. That said, an invocation framework can also accommodate other activities as well if desired. Examples of such additional activities include, but are not limited to, Card Invocation (spawning a Card target), Viewer Invocation (spawning a Viewer target), Service Invocation (spawning an on-demand Service target), Brokering (locating an appropriate handler for invocation by matching invoke and target filter metadata), Querying (providing a list of best fit supporting targets for a specified invocation), Target presentation (providing query results with icons and labels that can be used to present the list to a user), and File Transfer Handling (managing the transfer of file-based data between private data areas as correspond to various processing entities).

Per this illustrative example, an invoke is a passive data structure that describes the action to be performed and the data to act on (for example, a request). If desired, an invoke can also comprise an action that has been performed and the data describing it (for example, a notification). An invocation may be passed to a target when it is started (and therefore comprise an invoke on launch) or as a message once the target is running.

For the sake of an illustrative example, it will be presumed here that an invocation may contain: (1) a Target (an optional identifier of the target that should handle the invocation); (2) a Source (optional identifiers (for example, gid/dname) for the sender; (3) an Action (at least one stringF identifying the action to be performed; (4) Data (the data to be acted on as identified by a Uniform Resource Identifier (URI) that points to the data, the Multipurpose Internet Mail Extension (MIME) type that describes the type and format of the data and, optionally data value for small data transfers; and (5) Metadata (an additional optional string included by the sender. Accordingly, by one approach a valid invocation must include either a MIME type, a URI, or both.

The aforementioned target comprises a component (such as, for example, a processing entity) that is able to handle an invocation. At runtime, targets are hosted by a corresponding process. A target may therefore be part of a larger component such as but not limited to an application, a card, a viewer, a service and so forth. By one approach the target host will declare the target in its application descriptor against an entry-point. When declaring a target, a globally unique target-key can be provided. In order to help with the selection of a unique value the key format can follow a reverse Domain Name System (DNS) structure (akin, for example, to a Java™ package name) though other approaches are certainly available. By one approach an over-riding system authority can assure that such target keys are unique within a given system.

An illustrative example of such an application descriptor XML can be declared, for example, as shown in Table 1:

TABLE 1

```
<invoke-target id="blackberry.imageview">
    <entry-point-id>entry.point.key</entry-point-id>
    <entry-point-name>Image View<entry-point-name>    // optional, if
                                                         omitted the
                                                         label will
default to the associated entry-point label
    <icon></icon>                                    // optional, if
                                                         omitted icon
                                                         will default
    to
associated entry-point icon
    <invoke-target-type>application</invoke-target-type>
    ... can declare filters here
</invoke-target>
```

An invocation framework will also accommodate system targets if desired. By one approach a system target may choose a target-key from within a reserved root domain. As such, when developing a system target consult a system target-key registry to register for a unique target key for your system target.

The aforementioned action value is a string that names an action to be performed by the target or in some cases an action that has occurred and regarding which the target is being notified. By one approach the action name comprises a compound name such as bb.action.OPEN. (Those skilled in the art will recognize and understand the foregoing to merely be a suggestion as to one possible convention in these regards with numerous other possibilities being available.)

In this illustrative example the invocation framework can support at least two key action types, discoverable actions and menu actions. Discoverable actions are declared in target filters and can be returned as a result of querying the invocation framework. Discoverable actions facilitate late binding by allowing clients to look up "best fit" targets. If desired, new discoverable actions can be added to the platform by declaring them in a target filter. If desired, the invocation framework can also support at least a third action type for undeclared/non-discoverable actions (so categorized by virtue of not being identified by any target filters but which are known privately, for example, to at least two parties and which can be invoked and discovered (for example, by a corresponding query)).

By one approach, the available discoverable actions can include a so-called "most intuitive operation" (MIO). The MIO is the action that should be performed implicitly when the user taps an item (as opposed to executing a tap-and-hold). This can comprise, for example, assigning a VIEW action as the MIO. Tapping content (such as a document email attachment) could therefore be realized by creating an invocation based on the discoverable action bb.action.VIEW and the type of the tapped content. The invocation framework could then invoke the default target for that action/type/uri combination.

If desired, when an invocation is sent that does not specify an action, the invocation framework can default the action value to the MIO. If no appropriate handlers are found for the MIO, the invocation framework can default to a default action, such as an OPEN action. If no candidates are found that support the default action then the invocation can be treated as a failure.

Menu actions, on the other hand, are discoverable actions that can be presented in menus and have an associated presentation icon and label for different locales. A few illustrative examples of menu actions could include bb.action.OPEN (corresponding to an action to display the content with the full application capability; for example, using menu ction bb.action.OPEN on a document would open the document for editing), bb.action.SET (corresponding to an action to assign the value of the content; for example, using the action bb.action.SET with an image may be used to assign the system wallpaper), and bb.action.SHARE (corresponding to an action to transfer the content to the target; for example, sharing an image to BLUETOOTH™ would transfer the image to another device via BLUETOOTH™).

In the present example data is a URI, MIME type, and value combination. The URI describes the location of the data to be acted on, while the MIME type describes the type and format of the data. In some cases the MIME may be inferred from the URI but the present teachings make it possible for the sender to specify the MIME type of the data to which the URI points. If a MIME type is specified then type inference need not be applied and the specified type simply used. If the URI is not specified it can be implied that the data is being transferred in-band (that is, in the body of the invoke message) and can be found within the data value portion of the message. As an illustrative example, the implied URI can be data://local in a given application setting.

The data value is optional and may not be used if the data is sent out of band (for example, pursuant to a file transfer). It is the responsibility of the client/target to agree on the known format of the data pointed to by the URI on the basis of the MIME type. In order to help coordinate these agreements, a corresponding Invoke Action-Type Registry can contain the complete set of known types and formats. When specifying the MIME type, an invocation may, by one approach, use wild cards to denote any (e.g. " ") or any subtype (e.g. "image/").

In the present illustrative example the invocation framework will support both bound and unbound invocation. In general, when sending an invocation the client must identify the target recipient using its target-key. Clients can use bound invocation to invoke well known/common platform targets. Bound invocation can be used along with the query facilities in order to first select a "best fit" candidate and then perform directed invocation. Targets may receive bound invocations even if they have not declared any target filters. As a matter of convention a bound invocation can provide an action value indicating what action should be performed. That said, bound invocations need not be subject to brokering if desired so the invocation framework need not inspect the action, type, or URI attributes.

Clients perform unbound invocation by sending the invocation without specifying a target. For unbound invocation, the invocation framework performs candidate brokering and selection in order to locate an appropriate target.

Figure 3:
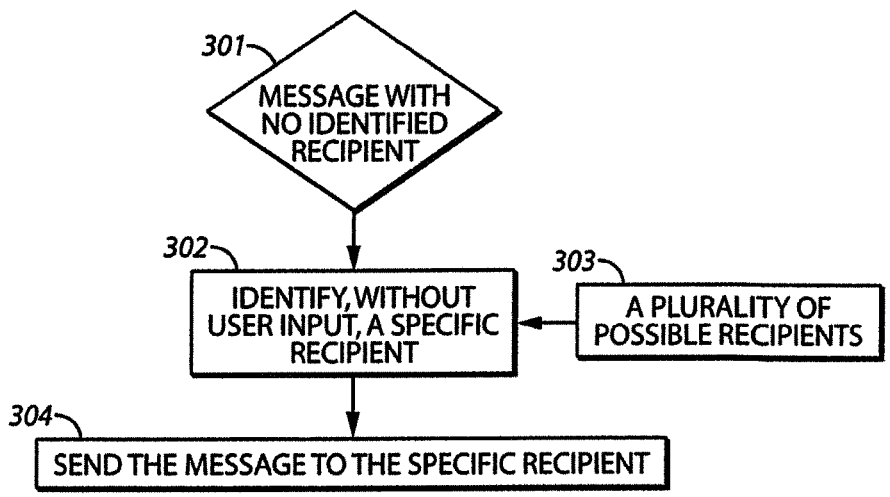
FIG. 3 is a flow diagram in accordance with the disclosure.

By one approach, and referring to FIG. 3, these teachings will support having the aforementioned control circuit 101 detect, at 301, a first opportunity to send a message with no recipient yet identified. Apropos to the foregoing this opportunity can correspond to a client having send an unbound invocation.

At 302, the control circuit 101 can then identify, without user input, a specific recipient from amongst a plurality of possible recipients 303 of the message. This plurality of possible recipients 303 can include, by one approach and at the very least, a plurality of different processing entities. By one approach this activity includes, at least in part, developing a pool that comprises a plurality of candidate recipients as a function, at least in part, of metadata regarding at least some of the possible recipients 303. At least some of this metadata can be self-sourced by corresponding possible recipients if desired. In any event, by one approach the control circuit 101 can use at least one predetermined selection criterion to select only one of the candidate recipients as the specific recipient.

At 304 the control circuit 101 can then send the message to the selected specific recipient.

By way of a more-specific example in these same regards (but without intending any limitations in these regards by way of this specificity), unbound invocations can be required to provide a MIME type, a URI, or both. If an unbound invoke does not specify an action, by one approach the invocation framework can apply its own logic. The latter can comprise, for example, looking for a handler for a VIEW action and falls back to an OPEN action if no view handlers are found. In this example, if no OPEN action handlers are then found the invocation will fail.

By one approach the invocation framework will accommodate determining the candidate targets for an invocation by querying. As part of the query the invocation framework can perform brokering in order to find the set of matching target filters based on the action/MIME type/URI combinations. Based on the query the invocation framework can return matching targets grouped by action. The result target information can include the target-key, presentation data (such as the target icon and label), and target type indicator. When the query specifies action(s), only targets that provide the specified action(s) need be returned. By one approach a query can be required to provide a MIME type, a URI, or both. These teachings will accommodate a query for specific target types (such as only applications or only viewers). In addition, these teachings will permit querying only for targets that support menu actions such that the results can be displayed to the user for selection.

The aforementioned invocation brokering is the process by which the invocation framework determines the set of candidate targets for an invocation or a target query. In order to resolve the candidates the invoke attributes can be compared to registered target filters. Target filters describe the kinds of invocations that a given target supports. Targets that register filters may receive unbound invocations that match the filter criteria. That said, a target that does not register filters may still receive bound invocations. By one approach, when comparing invocations and filters the invocation framework can consider both the action and the corresponding data (including both URI and MIME type).

By one approach the targets declare filters in order to describe the kinds of unbound invocation they support. To this end a target may specify a set of filters. Through unbound invocation (or query) a target will only receive invocations that match one of its filters. A filter, in turn, describes the action/MIME type/URI combinations for which the target supports unbound invocation. For the sake of an illustrative example and without intending any specific limitations in these regards, an invocation target filter can by specified by: (1) at least one valid action; (2) at least one valid MIME type (though wildcard values may be accepted in these regards if desired); (3) a uris prefix (the uri value must be a prefix of the invoke uri value in order to match (for example, file:// or http://localhost:port or file:///specific/path/); when the uri is not specified than an in-band uri (data://local) can be implied if desired); and, perhaps optionally, (4) an exts value describing the supported file extensions expressed as a suffix of the path in order to be a match.

The illustrative example presented in TABLE 2 shows the declaration of a target with two filters. A first filter describes support for OPEN/VIEW of jpeg and png images sent via file URI. The second filter describes support for OPEN/VIEW of any file URI with the jpg or png extension.

TABLE 2

<invoke-target id="blackberry.imageview">
...
<filter>
<action>bb.action.VIEW</action>
<action>bb.action.OPEN</action>
<mime-type>image/png</mime-type>
<mime-type>image/jpeg</mime-type>
<property var="uris" value="file://"/>
</filter>
<filter>
<action>bb.action.VIEW</action>
<action>bb.action.OPEN</action>
<mime-type>*/*</mime-type>
<property var="uris" value="file://"/>
<property var="exts" value="png,jpeg"
</filter>
...
</invoke-target>

Invocation matching is the process by which the invocation framework broker determines candidate targets by comparing an invocation/query to such target filters. By one approach, for example, in order for a target to be considered a match, one of its filters must pass each of two matches for action and type.

A target filter can be considered an action match when either the action specified in the invoke matches one of the actions declared in the target filter or the invoke does not specify an action, and hence by default all filters are considered an action match.

As for type matching, when matching the invocation type the URI and MIME type can both considered. URI matching involves comparison of the "uris" and "exts" attributes of the filter against the "uri" attribute of the invocation. A URI, for example, can have the form <scheme>://<host>:<port>/<path>=<scheme>://<authority>/<path>. The foregoing presumes that a host and port are the authority. These values are used cumulatively in comparison such that the uri is considered a match if any of the values specified in "uris" is a prefix of the uri provided in the invoke. Similarly, if the filter specifies "exts" values it is considered a match if one of the "exts" values is the suffix of the path element of the uri provided in the invoke.

A MIME type comparison, in turn, can be performed between the MIME type provided in the invocation and the MIME type provided in the target filter. Both the invocation and the target filter may use a wildcard in the subtype of the MIME type if desired. Accordingly, by one approach, a target filter can be considered a type match when: (1) the invoke specifies a uri and a MIME type (or it can be inferred from the uri) and the filter has declared a matching type and the invoke uri matches a uri and ext declared in the filter (it being presumed that wild cards apply to MIME type matching, that if the MIME type is specified then the type is not inferred from uri, that the absence of a declared ext in the filter implies an ext match, and the absence of the uri in either the invoke and filter implies data://local); (2) the invoke does not specify a MIME type (and it can't be inferred from the uri), and the filter has declared matching uri and ext (presuming the absence of the uri in either the invoke and filter implies data://local and the absence of a declared ext in the filter implies an ext match); or (3) the invoke does not specify a uri and the filter has declared a matching type and has either not declared any uri (implies data://local) or has explicitly declared the uri=data://local. During an unbound invocation the invocation framework first brokers the invoke message using the matching rules to determine the set of applicable targets.

Once the candidates have been identified the invocation framework performs target selection by applying rules in order to identify a single candidate target for invocation. For example, the invocation framework may select the filter with the deepest/strongest URI match. (By one approach, for uris declared in target filters the invocation framework might only consider the scheme portion for comparison purposes to determine the strength of the match. In such a case the filters declared in the defaults file can be treated as the full length of the declared URI match. Using such an approach the invocation framework can be assured that a default declaration can win a URI match.)

If, however, more than one filter has the longest matching URI, then of those filters the filter with the deepest/strongest MIME type match is selected (if desired, the type wildcard " " can be considered the weakest match, subtype wildcard "type/" can be considered weak, and a match without wildcards can be considered the strongest). If more than one filter has the strongest MIME type match then of those filters, the filter with the ext match is selected. If more than one filter has a matching ext then of those filters, the filter marked as default for that set of filter criteria is selected. If no filter has been identified as default then the oldest (first in) filter is selected as the match.

By one approach, the invocation framework can associate a default target with each action/type/uri combination. Specifically, the invocation framework selects the first registration for an action/type/uri combination as a default. The default mechanism itself can comprise the static provisioning of specific default target filters in a corresponding file. This file can be configured to contain a priority-ordered set of filters to be considered "default" as defined by the target selection rules. Each entry in the defaults file can assume the form shown in TABLE 3 (with further characterizing information appearing in TABLE 4).

TABLE 3

<priority>:json:{
"target-key":<target-key>,
"filter":<target-filter>
}

TABLE 4

| Attribute | Value | Decription | Mandatory | Example |
|---|---|---|---|---|
| priority | 'p' followed by a number | unique number indicating the order in which the filter should be applied (lower value - higher chance of being selected) | yes | p1 |
| target-key | up to 50 characters based on the following grammar: target-name: <domain><sub-domain> sub-domain: MUL \| .<domain><sub-domain> domain: [a-zA-Z] ([a-zA-ZU-9_])* | unique identifier for the target against which the default filter is defined | yes | "com.acme.target" |
| target-filter | string | description of the default filter values | yes | "actions=bb.action.VIEW:types=\uris=file://;exts=jpg;" |

These default target entries can be used, for example, during filter matching and target selection when the specified target has been registered with the invocation framework. If no target matching the specified target-key has been registered, then, by one approach, the invocation framework can cache the default filter declaration until such time as a processing entity registers a corresponding target-key.

URI handling is the ability to direct a URI invocation based on the URI. A challenge in addressing the URI handling mechanism is providing the flexibility for applications (including 3rd parties) to handle certain URI schemes and patterns while also maintaining sufficient control over the device experience. In order to balance these competing requirements the invocation framework can handle query and bound invocations on the one hand and unbound invocations on the other hand as follows.

Figure 4:
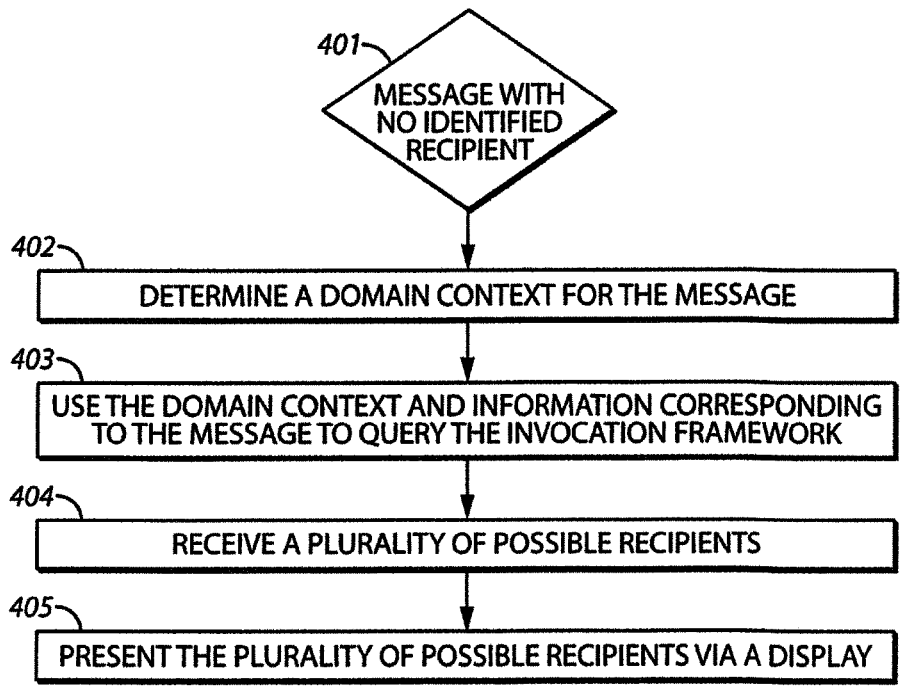
FIG. 4 is a flow diagram in accordance with the disclosure.

When query and bound invocation is used the invocation framework can apply only matching and return the results without performing target selection if desired. The client can then perform target selection and subsequent bound invocation. FIG. 4 presents an illustrative example in these regards.

At 401 the control circuit 101 detecting an opportunity to send a message with no recipient yet identified. As a simple example in these regards, an image file may have just become available and the device has a plurality of different image-processing applications available for use with such an image file.

At 402 the control circuit 101 determines a domain context for the message because the invocation framework itself cannot natively intuit domain context from the available information. At 403 the control circuit 101 uses the domain context along with information corresponding to the message to query the invocation framework.

At 404 the control circuit 101 receives a plurality of possible recipients from the invocation framework and at 405 the control circuit 101 presents at least some of the plurality of possible recipients via, for example, the aforementioned display 212. By one approach these possible recipients (which may comprise, for example, a variety of applications) can be presented via a corresponding menu to thereby facilitate the user selecting one such recipient.

It will be noted that the processes presented in FIGS. 3 and 4 both offer approaches that can be applied when dealing with a message that lacks an identified recipient. The process described in FIG. 3, however, works to identify a specific, single, correct recipient whereas the process shown in FIG. 4 simply provides a suitable, worthy group of possible recipients on a display to thereby permit a user to make a corresponding selection. To illustrate the different by way of a specific example, when presenting an image file, the FIG. 3 process would operate to select a particular image-handling application whereas the FIG. 4 process would result in presenting the user with a variety of available and suitable image-handling applications.

By one approach the user can be provided with the ability to selectively invoke one or the other such process. For example, a first user gesture (such as a tap on a touch-sensitive display) could serve to invoke the FIG. 3 process and a second, different user gesture (such as a tap-and-hold or a tap-and-swipe gesture on the touch-sensitive display) could serve to invoke the FIG. 4 process.

Figure 5:
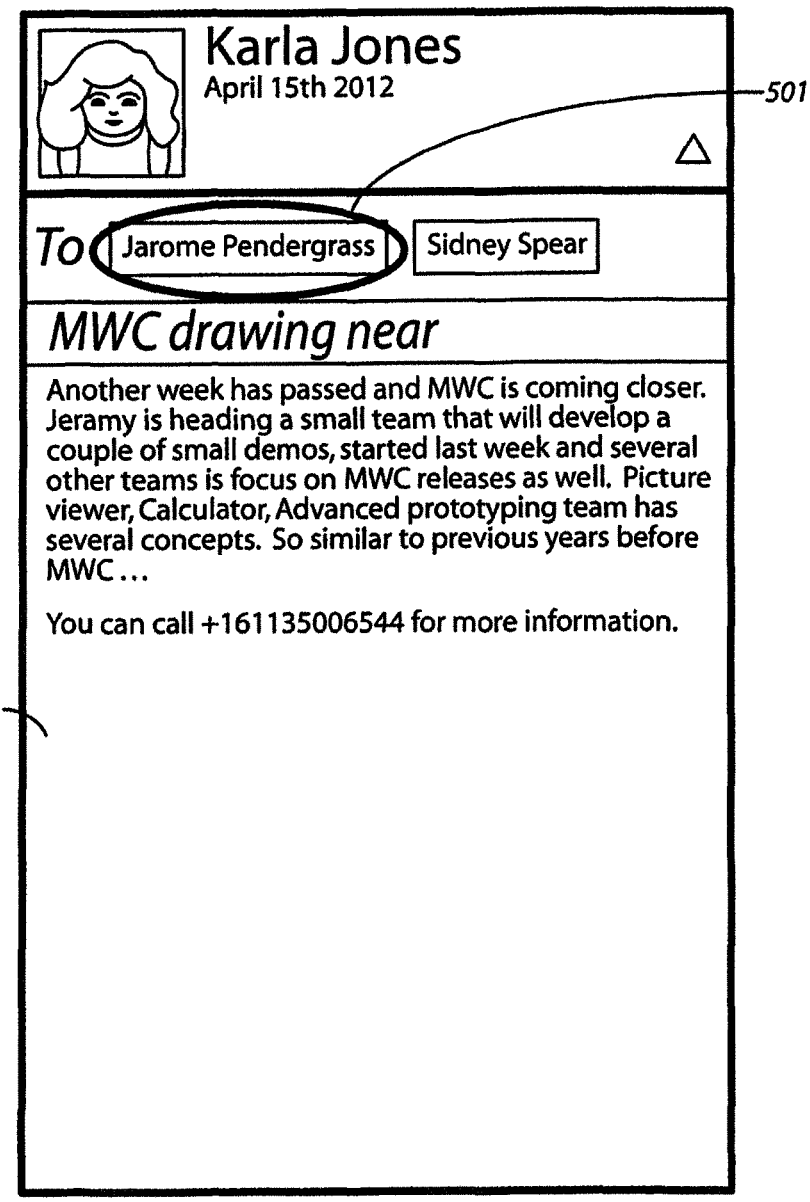
FIG. 5 is a screen shot in accordance with the disclosure.

To illustrate by way of a non-limiting example, FIG. 5 presents a display 212 that presently displays an opened email. One of the addressees of this email is "Jerome Pendergrass" as denoted by reference numeral 501. By one approach, a quick tap on this name can serve to invoke the process set forth in FIG. 3. In this particular example, this process might identify an email application as being the one "best" recipient application. Accordingly, a single tap on this person's name in this context could cause an email application to open, perhaps with a new email draft with this person's name pre-populated in the "to" field.

Figure 6:
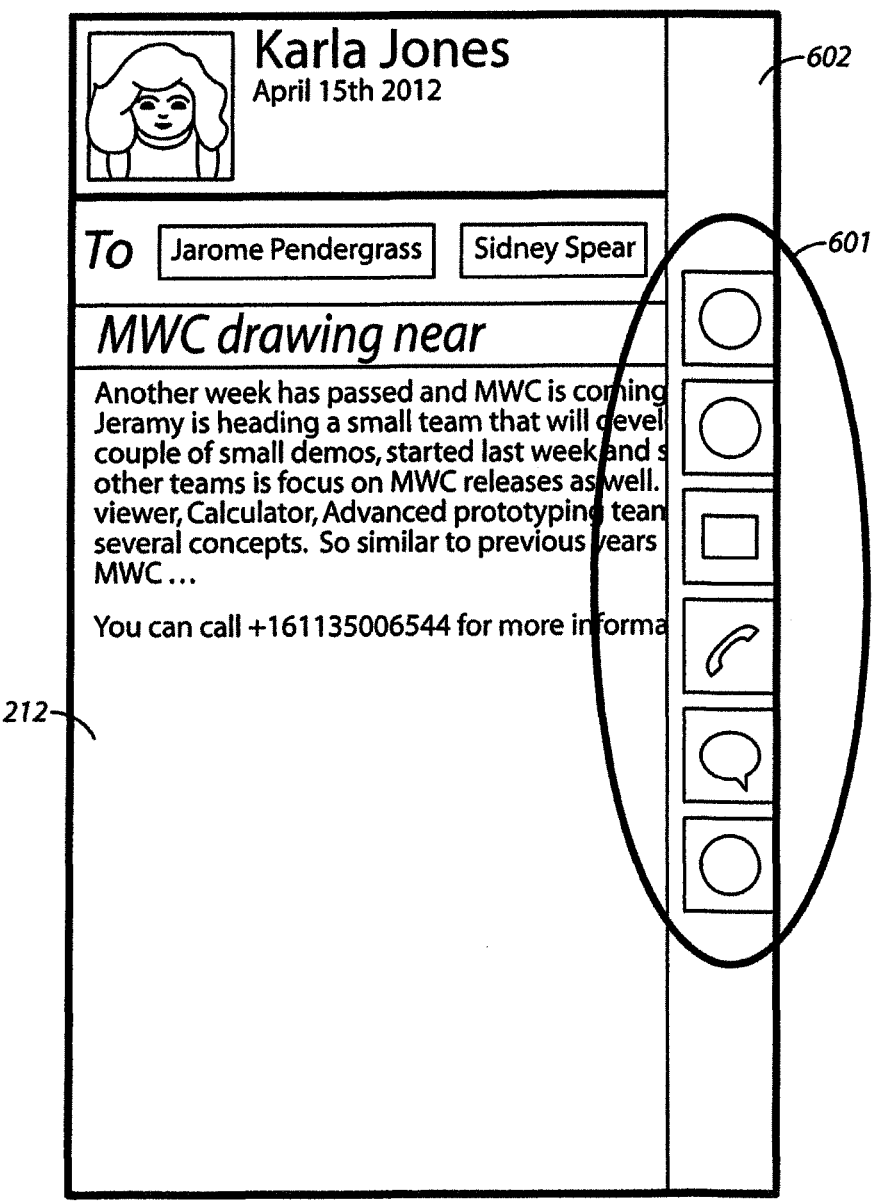
FIG. 6 is a screen shot in accordance with the disclosure.

If, however, the user performs a different gesture with respect to this name the process of FIG. 4 can be carried out instead. For example, if the user executes a tap-and-hold gesture on this same name, instead of selecting a single recipient/application the process of FIG. 4 will return a variety of suitable candidate applications. As shown in FIG. 6, these various candidate applications 601 can appear on the display 212 (as corresponding representative icons) in a corresponding menu bar 602. So configured, the user can select one of the available applications 601 by tapping on the appropriate icon.

Figure 7:
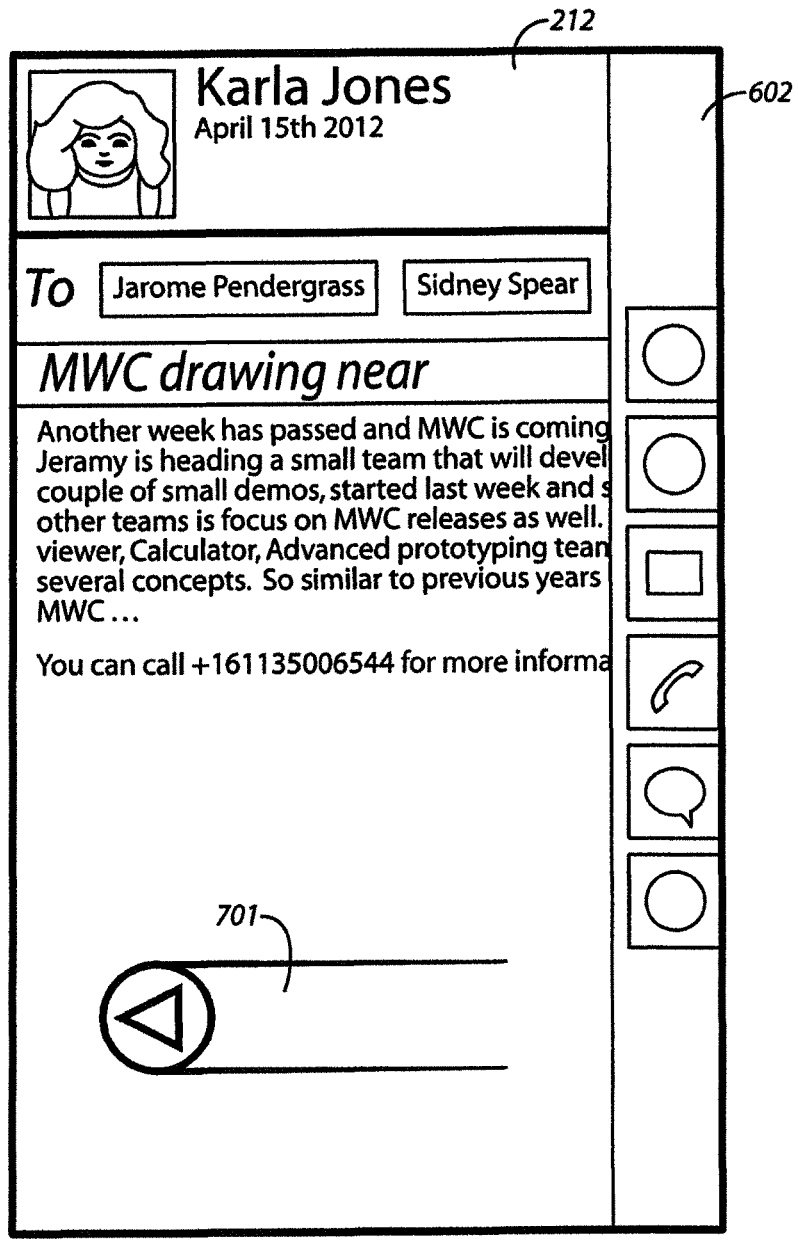
FIG. 7 is a screen shot in accordance with the disclosure.
Figure 8:
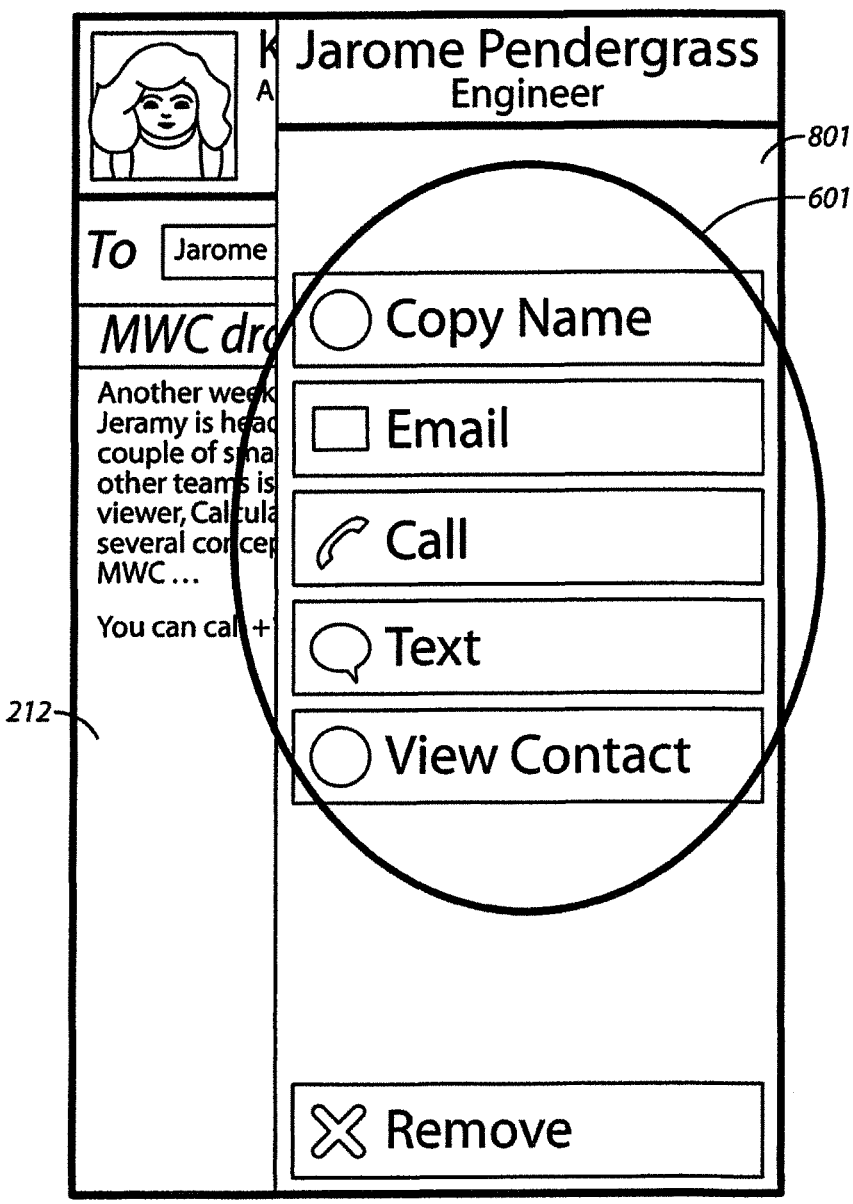
FIG. 8 is a screen shot in accordance with the disclosure.

By one approach, and referring to FIGS. 7 and 8, if the user should instead execute a swipe gesture 701 that begins in the aforementioned menu bar 602, the menu area 801 can expand to offer a less-abridged/condensed presentation of the candidate applications 601. Again, the user can select one of the available applications 601 in this expanded presentation by tapping on the desired application.

In the case of URI handling, the invoke message may be required to also contain the URI to be handled. In order to identify a single target during unbound invocation the invocation framework may apply corresponding rules for comparing target filters as described above.

Based on the selection rules, processing entities such as applications that want to handle certain URI schemes can declare the supported scheme as part of the "uris" filter attribute. To protect key aspects of the device experience (such as the browser experience), the invocation framework can restrict the portion of the uri used during selection to the uri scheme only (by one approach, up to the first ':'). During matching, the invocation framework will match the uri based on the fully specified prefix. However, during selection the invocation framework may consider only the scheme of the uri specified in the target filter.

In addition to URI handling, the invocation framework can also support file handling based on file extension for invocations whose data is referenced by a URI with, for example, the scheme "file://". The invocation framework can support the declaration of target filters with the "exts" attribute which defines a comma separated list of supported file extensions. The filter is an attribute match when the file URI is suffixed with a file extension that matches any one of the extensions declared in the "exts" attribute. When the "exts" attribute is defined, the filter implicitly supports the uris="file://" for those the declared extension cases.

The described invocation framework is highly flexible in practice and will accommodate a wide range of modifications and variations. By way of illustration a number of examples in these regards will now be provided. As before, these examples are provided for the purpose of illustrating the breadth of these teachings and are not intended to suggest any particular limitations in these regards.

A typical modern processing platform will often host a wide variety of different processing entities (both hardware based and software based). Examples can include but are not limited to subroutines as well as discrete applications and the like. By one approach these processing entities can have a corresponding private data area. Such a private data area can serve, for example, to store files for the corresponding processing entity. Being "private," other processing entities cannot access, in ordinary course, such files and hence the integrity of these files is better assured.

That said, there are many operating circumstances that benefit by the sharing of such information amongst processing entities. By one approach a shared data area can serve to hold such information. Being a shared area, information so placed can be readily shared amongst the processing entities. There are numerous concerns that can arise when placing data in an intervening shared data area, however, including both security concerns and data-integrity concerns.

Generally speaking, a system administrator (such as the so-called root user (or superuser) in a Unix-style operating system) can access private data areas with impunity. That said, freely invoking a system administrator-like entity to access a private data area to read data and/or write data can render the entire notion of "private" an empty premise.

By one approach, the present teachings can facilitate sharing information (such as, but not limited to, one or more files) between processing entities that each have a corresponding private data area by having the aforementioned control circuit 101 place data corresponding to information from a first one of the private data areas for a first one of the processing entities directly into a second one of the private data areas for a second one of the processing entities without placing the data in an intervening shared data area and without directly invoking a system administrator-like entity. In particular, the invocation framework can be employed to transfer a privately-owned file (or access to that file) to a receiver's private inbox such that the file is never exposed to other applications on the implementing platform.

By one approach the aforementioned data can comprise substantially all, or literally all, of the aforementioned information. For example, when the information comprises a file, the placed data can comprise the complete file. By one approach this can comprise copying the file from the first private data area such that the original file remains in the first private data area. These teachings will also accommodate, however, moving the original file from the first private data area such that the file no longer remains in the first private data area following the aforementioned placement of the file in the second private data area.

Figure 9:
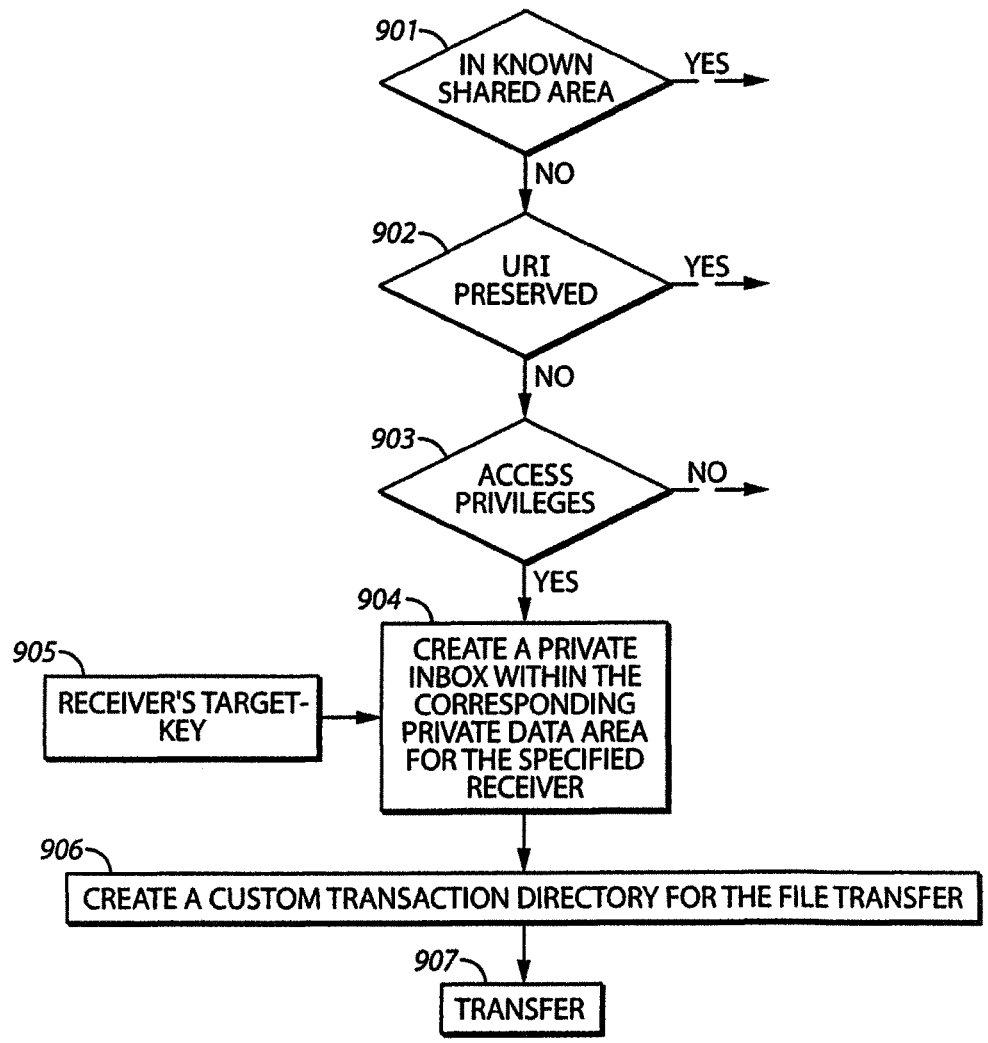
FIG. 9 is a flow diagram in accordance with the disclosure.

By one approach, and referring now to FIG. 9, in these regards the invocation framework can first ensure at 901 that the file to be transferred is not already in a known shared area (in which case there is no need to transfer the already-shared files using a higher-level approach and the process can halt the transfer or utilize another approach to effecting the transfer as desired).

If desired, at 902 the invocation framework can also require that the sender not have specified that the URI should be preserved. When true the process can provide for such other processing as may be useful to suit the needs of a given application setting.

If the file is private, the invocation framework can then ensure at 903 that the sender actually has the appropriate access privileges to the file. So configured, the invocation framework will not transfer a file to which the sender does not itself have access privileges.

The invocation framework can then create at 904 a private inbox (within, for example, the corresponding private data area) for the specified receiver. To do so the invocation framework can use the receiver's target-key 905 which is guaranteed to be unique within the perimeter of the system and which is mandatory for all invocation receivers in this example.

The invocation framework can also create at 906 a custom transaction directory for the file transfer to ensure that files of the same name will not be overwritten. As an illustrative example in these regards, the invocation framework can create such a target inbox using the associated target-key as the directory name as follows:

```
/accounts/<perimeter>/invoke/<target-key> <invoke-
uid>:<invoke-gid> drwxr-s--- (2750), ACL
g:<target-gid>:rwx
```

Lastly, the invocation framework can then perform the transfer and 907. By one approach, when transferring files the invocation framework can place those files in a unique transaction directory to ensure that these files do not interfere in any way with existing transfers. By one approach this transaction directory can be named based on a unique transaction-identifier generated by the invocation framework. For example, the identifier can have a form that requires up to 15 characters total, that carries the prefix "xa," and where the suffix is up to 13 characters (for example, xa0123456789012).

One illustrative example for creating such a transaction directory in the target's private inbox by the invocation framework is:

```
/accounts/<perimeter>/invoke/<target-key>/<transaction-id>
<invoke-uid>:<invoke-gid>drwxr-s---
(2750), ACL -g:<target-gid>:rwx
```

As noted above, these teachings contemplate effecting such a transfer without directly invoking a system administrator-like entity. By one approach a so-called imposter capability can serve in these regards. Any protocol of choice can serve to vet the basic authorization of the entities that are participating in the planned transfer. The invocation framework may accommodate, for example, an invitation-based process by which the owner of a file to be transferred/linked specifically identifies, in a deliberate and secure manner, a specific intended target to have access to the file.

The invocation framework can then, at least temporarily, treat the receiving target as being the same as the sender. While permitting the receiver to act as an imposter in this way will then permit the desired placement of data to proceed without otherwise encountering security and authorization obstacles, the entity acting as the imposter in fact lacks any power or authorization to act as a system administrator-like entity because neither party had such authority to begin with.

By one approach the invocation framework creates, by default, a copy of the file with read and write permissions to the receiver. If desired, the invocation framework will accept an override to this default state by permitting, for example, the file to be placed with read-only limitations. The invocation framework then notifies the receiver by sending the receiving processing entity an invocation with an appropriate URI that points to the file in the receiver's private inbox.

In addition to performing such a transfer between private data areas, if desired the invocation framework can also manage the creation and/or deletion of private target inboxes and the transferred data. By one approach, for example, the invocation framework can guarantee file availability for the life of the process that handles the invoke. Also if desired, once the target disconnects the invocation framework can clean up the associated data. The invocation framework can be configured, however, to permit targets to remove inbox files themselves prior to disconnecting if desired. Similarly, and again if desired, when a target is uninstalled the invocation framework can automatically clean up any associated inbox artifacts as pertain to such direct transfers.

By another related approach, in lieu of the foregoing or in combination therewith as desired, the invocation framework can effect the desired result by placing in the second private data area data that comprises, at least in part, a direct link to the information in the first private data area. While potentially more internally efficient, this form of transfer can benefit from care in implementation as any update to the data in the file as it resides in the first private data area will be perceived by both processing entities, even post transfer.

When providing such a link, if desired the invocation framework can be configured to provide the link only in conjunction with read-only authorization to the receiving processing entity to thereby prohibit the latter from making changes to the original information in the sender's private data area.

In lieu of the foregoing approach to providing access to a file notwithstanding the use of private data areas, or in combination therewith as desired, these teachings will also accommodate the sharing of information that resides in a processing entity's private data area by pre-populating the private data area of many (or all) such processing entities with a plurality of directories. Each of these directories can, in turn, have a one-to-one correspondence to a particular predetermined information recipient. Upon detecting that information is placed in a given one of the plurality of directories, the control circuit 101 can then provide a link to a given one of the predetermined information recipients as corresponds to the given one of the plurality of directories where information has been placed to provide the corresponding predetermined information recipient with at least read access (and write access as well, if and when desired) to the information.

By one approach the foregoing predetermined information recipients can each comprise a pre-registered information recipient. These teachings are again very flexible in the foregoing regards and will accommodate, for example, having a search service comprise at least one of the pre-registered information recipients if desired.

So configured, these various processing entities can each provide access to their private files to other processing entities in the form of a link that is directly placed in a corresponding directory that is itself located in the private data area of a desired recipient. As this link resides in a private data area, only the processing entity that owns that private data area has access to that link and hence to the linked information.

By way of an illustrative example, presuming these directories to be named sharewith directories, the aforementioned links can be created for each registered recipient using the format
/accounts/1000<-perim>/appdata/<app_dname>/sharewith/<service_name>/

These links point to a fanning out of directories elsewhere on the file system, one per launched application:
/accounts/1000<-perim>/sharewith/<service_name>/<app_dname>/

Accordingly, using one or more of the above-described approaches, the invocation framework will readily accommodate supporting and maintaining private data areas on a per-processing entity basis while also facilitating the convenient and secure selective sharing of information stored within such private areas.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

I claim:

1. A method for selectively invoking one of two processes based on a type of user gesture, comprising:
   using a gesture-recognition interface operably coupled with a control circuit of a device, identifying a single user gesture associated with data content presented on a display;
   identifying a type of the user gesture;
   determining that a client has sent an unbound invocation comprising opportunity to pass an invocation message with no processing entity yet identified;
   determining that the unbound invocation provides each of a location of the data content to be acted on by a processing entity and a type of the data content;
   determining that the unbound invocation did not specify an action value;
   assigning an action value to the invocation message indicating an action to be performed on the data content; and
   without requiring additional user input, selectively performing an invocation process according to the type of the user gesture identified;
   responsive to determining that the user gesture is a first type of user gesture, performing a first invocation process, comprising:
      identifying a specific processing entity to receive the unbound invocation and perform the action, according to the data type, the assigned action value, and the type of the user gesture, from amongst a plurality of possible processing entities suitable to handle the invocation message; and
      passing the invocation message to the identified specific processing entity whereupon the identified specific processing entity executes the action on the data content; and
   responsive to determining that the user gesture is a second type of user gesture different from the first type of user gesture, performing a second invocation process, comprising:
      determining a domain context for the invocation message;
      using the domain context and information corresponding to the invocation message, querying an invocation framework that cannot natively intuit domain context from the information;
      receiving from the invocation framework a plurality of possible processing entities; and
      presenting the plurality of possible processing entities via the display.

2. The method of claim 1 wherein identifying the specific processing entity from amongst the plurality of possible processing entities in the first invocation process comprises, at least in part, developing a pool comprising a plurality of candidate processing entities as a function, at least in part, of metadata regarding at least some of the possible processing entities.

3. The method of claim 2 wherein at least some of the metadata is self-sourced by the possible processing entities.

4. The method of claim 2 wherein identifying the specific processing entity from amongst the plurality of possible processing entities further comprises, at least in part, using at least one predetermined selection criterion to select only one of the candidate processing entities as the specific processing entity.

5. An apparatus having a plurality of processing entities comprising:
   a user-input interface identifying a single user gesture associated with data content presented on a display; and
   a control circuit configured to selectively effect one of a first invocation process and a second invocation process, based on a type of the user gesture, wherein:
   the first invocation process comprises:
   detecting, from a first type of user input, that a client has sent an unbound invocation comprising a first opportunity to pass a processing entity an invocation message with no processing entity of the plurality of processing entities yet identified;
   determining that the unbound invocation provides each of a location of the data content to be acted on, a type of the data content;
   determining that the unbound invocation did not specify an action value;
   assigning an action value to the invocation message indicating an action to be performed on the data content; and
   without requiring additional user input, selectively performing an invocation process according to the type of the user gesture identified;
   responsive to determining that the user gesture is a first type of user gesture, performing a first invocation process, comprising:
      identifying a specific processing entity to receive the unbound invocation and perform the action, according to the data type, the assigned action value, and the type of the user gesture, from amongst a plurality of possible processing entities suitable to handle the invocation message; and passing the invocation message to the identified specific processing entity whereupon the identified specific processing entity executes the action on the data content; and responsive to determining that the user gesture is a second type of user gesture different from the first type of user gesture, performing a second invocation process, comprising:
  determining a domain context for the invocation message;
  using the domain context and information corresponding to the invocation message, querying an invocation framework that cannot natively intuit domain context from the information;
  receiving from the invocation framework a plurality of possible processing entities; and
  presenting the plurality of possible processing entities via the display.

6. The apparatus of claim 5 wherein the control circuit is further configured to detect the first opportunity by detecting a first user gesture and to detect a second opportunity by detecting a second user gesture that is different from the first user gesture.

7. The apparatus of claim 6 wherein the user-input interface comprises a touch-sensitive display that operably couples to the control circuit and wherein the first user gesture and the second user gesture are touch-sensitive display-based gestures.

8. The method of claim 1, wherein the identifying the specific processing entity without user input, from amongst a plurality of possible processing entities of the invocation message, further includes using a priority-order filter set with a target filter.

9. The method of claim 8, wherein a filter in the priority-order filter set uses wildcards denoting a weaker match that is least likely to be selected.

10. The method of claim 1, wherein the identifying the specific processing entity, without user input, from amongst a plurality of possible processing entities of the invocation message, further includes using wildcards to match the type of the data content.

11. The method of claim 1, wherein the identifying the specific without user input, from amongst a plurality of possible processing entities of the invocation message, further includes using wildcards to match the location.

12. The method of claim 11, further includes using a priority-order filter set wherein a filter in the priority-order filter set using the wildcards to match the location denotes a weaker match that is least likely to be selected.

13. The method of claim 1 wherein the user gesture is selected from a group consisting of: a tap, a tap-and-hold, and a tap-and-swipe.

14. The method of claim 8 wherein assigning the action value comprises assigning a discoverable action declared in the target filter.

15. The method of claim 1 wherein identifying the specific processing entity comprises identifying an application.

16. The method of claim 15 wherein the application is an image-handling application.

17. The apparatus of claim 5 wherein the processing entity comprises an application.

18. The apparatus of claim 17 wherein the application is an image-handling application.

19. The apparatus of claim 7 wherein the touch-sensitive display-based gesture is selected from a group consisting of: a tap, a tap-and-hold, and a tap-and-swipe.

20. The apparatus of claim 5 wherein the action value comprises a discoverable action declared in a target filter.

* * * * *